United States Patent
Swanson

(10) Patent No.: US 6,273,635 B1
(45) Date of Patent: Aug. 14, 2001

(54) MOUNTING FIXTURE FOR A MODULAR ASSEMBLY MACHINE

(75) Inventor: Douglas L. Swanson, McKean, PA (US)

(73) Assignee: Swanson Systems, Inc., Erie, PA (US)

( * ) Notice: Subject to any disclaimer, the term of this patent is extended or adjusted under 35 U.S.C. 154(b) by 0 days.

(21) Appl. No.: 09/309,164

(22) Filed: May 10, 1999

(51) Int. Cl.[7] ................. B25G 3/00; F16B 3/00; F16D 1/00; F16G 11/00
(52) U.S. Cl. .................. 403/299; 403/381; 403/320
(58) Field of Search .................... 403/299, 381, 403/363, 240, 241, 230, 187, 188, 317, 320, 403; 29/50, 51, 57

(56) References Cited

U.S. PATENT DOCUMENTS

| | | | |
|---|---|---|---|
| 3,039,597 | 6/1962 | Merchant | 198/208 |
| 3,065,530 | 11/1962 | Merchant et al. | 29/428 |
| 3,105,330 | * 10/1963 | Grace | 51/217 |
| 3,143,792 | 8/1964 | Swanson et al. | 29/208 |
| 3,231,968 | 2/1966 | Swanson | 29/208 |
| 3,245,678 | * 4/1966 | Riehle | 269/315 |
| 3,967,816 | * 7/1976 | Ramsperger et al. | 269/9 |
| 4,045,039 | * 8/1977 | Pope et al. | 279/123 |
| 4,404,505 | 9/1983 | Swanson et al. | 318/561 |
| 4,911,348 | * 3/1990 | Rasor et al. | 224/321 |
| 4,921,378 | * 5/1990 | Kytola | 409/221 |
| 5,022,909 | 6/1991 | Swanson | 65/278 |
| 5,125,140 | 6/1992 | Sticht | 29/33 P |
| 5,186,314 | 2/1993 | Clopton | 198/860.2 |
| 5,243,745 | * 9/1993 | Varnau | 29/33 P |
| 5,277,512 | * 1/1994 | Dwillies | 403/348 |
| 5,361,894 | 11/1994 | Solcz | 198/860.1 |
| 5,551,795 | * 9/1996 | Engibarov | 403/381 |
| 5,617,909 | * 4/1997 | Duginske | 144/253.1 |
| 5,746,535 | * 5/1998 | Kohler | 403/258 |
| 5,904,242 | 5/1999 | Swanson | 198/860.2 |

* cited by examiner

*Primary Examiner*—Lynne H. Browne
*Assistant Examiner*—John B. Walsh
(74) *Attorney, Agent, or Firm*—Brinks Hofer Gilson & Lione

(57) ABSTRACT

A mounting fixture for a reconfigurable assembly machine having a plurality of modules with slots formed in their upper surfaces includes a hollow brick or cube having a plurality of intersecting keyways on the faces or surfaces of the cube. One of the keyways receives a first, locating key which is also received in the throat of the slots formed in the upper surface of the assembly machine module. The locating key includes a through opening which receives a threaded fastener having a head held captive in the T-slot. The key accurately positions the cube relative to the slot on the assembly machine module and the threaded fastener secures the cube thereto. The parallelism and perpendicularity of the various faces of the cube are highly accurate. Various assembly and testing components of the assembly machine are attached to the various remaining perpendicular and parallel (vertical and horizontal) faces or surfaces of the cube.

20 Claims, 4 Drawing Sheets

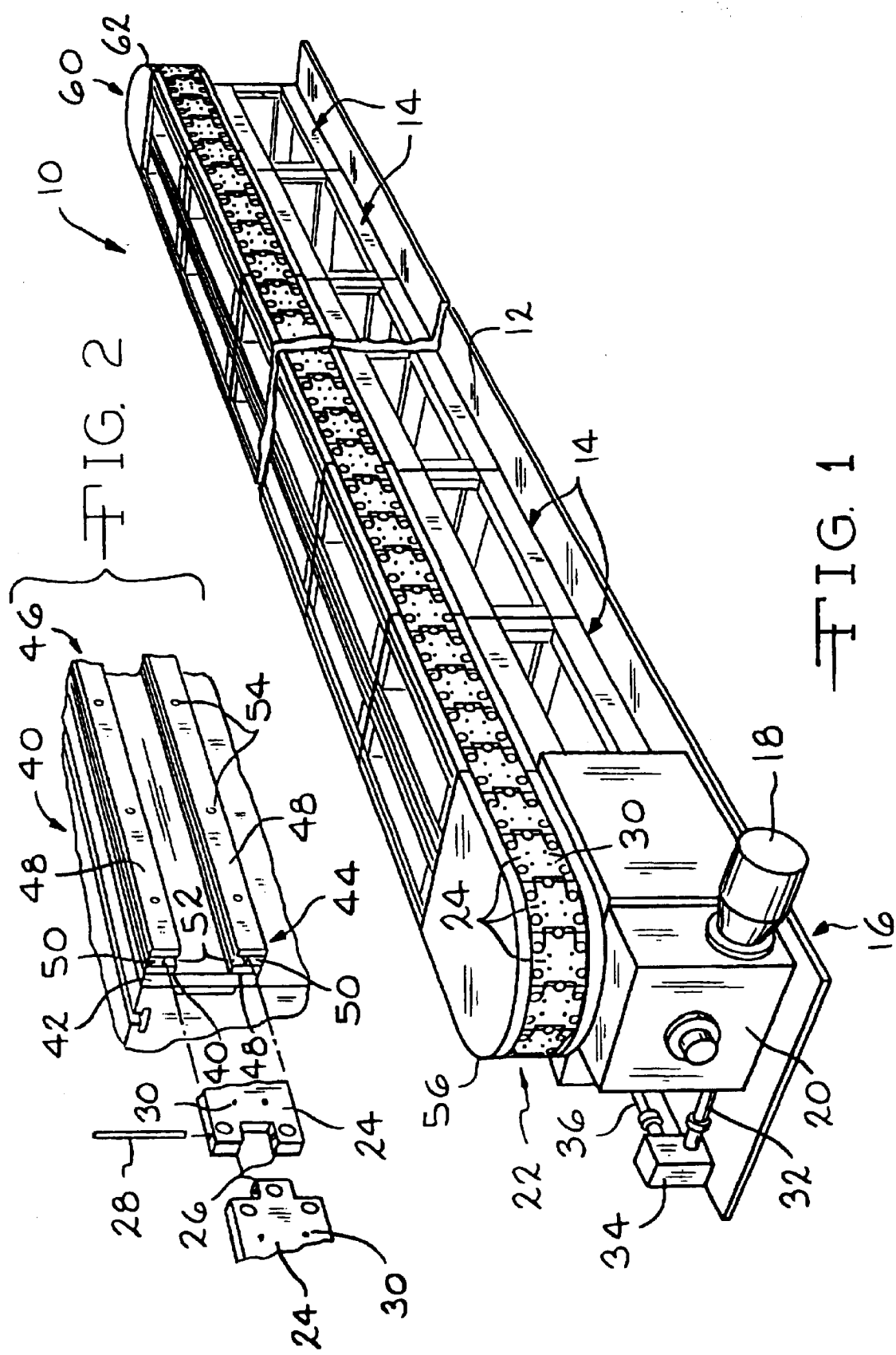

MOUNTING FIXTURE FOR A MODULAR ASSEMBLY MACHINE

BACKGROUND OF THE INVENTION

The invention relates generally to assembly machines and more specifically to a mounting fixture for an assembly machine including a mounting cube defining a plurality of keyways, at least one key and a threaded fastener.

Automated assembly machines may be categorized according to the fundamental physical layout of the machine that is, whether it is rotary or linear. In a typical linear machine, a recirculating belt or chain carries a plurality of product fixtures sequentially and linearly along a plurality of adjacent, stationary work stations. In a rotary machine, the product fixtures are disposed upon a circular, typically horizontal, plate which rotates about a center, vertical axis and presents the fixtures to a plurality of stationary work stations. Numerous considerations such as the number of work stations, the number of product fixtures, the ratio between these two numbers, work station cycle times and other factors influence the decision to select one or the other of these types of machines to fabricate a given product.

Linear or straight line machines are illustrated in commonly owned U.S. Pat. Nos. 3,039,597 and 4,404,505. A rotary assembly machine is disclosed in commonly owned U.S. Pat. No. 3,143,792.

While these machines provide exceptional control of the manufacturing process by virtue of their repeatability and operating tolerances, one difficulty shared by such machines, which is an outgrowth of their basic construction, is their dedication to a given manufacturing process. That is, a particular number of product fixtures and work stations necessary to produce a given product are relatively permanently arranged in such machines and are typically only broken down for repair or rebuilding. Clearly, during the period of repair or rebuilding of just a portion of such machine, the entire machine is unavailable for production. Furthermore, because of the unitary, dedicated construction of such machines, the ability to relatively quickly add or remove a certain process or tool fixture to add or delete a certain process step, is generally unavailable.

Hence, it has been found desirable in this general class of machines to have the flexibility of addition and deletion. Specifically, it has been found desirable to provide fixtures for such modules which facilitate not only rapid and accurate mounting of components and assemblies to the assembly machines but also rapid and simplified substitution or replacement of fixtures. The present invention is directed to providing such flexibility in linear assembly machines.

SUMMARY OF THE INVENTION

A mounting fixture for a reconfigurable assembly machine having a plurality of modules with slots formed in their upper surfaces includes a hollow brick or cube having a plurality of intersecting keyways on the faces or surfaces of the cube. One of the keyways receives a first, locating key which is also received in the throat of the slots formed in the upper surface of the assembly machine module. The locating key includes a through opening which receives a threaded fastener having a head held captive in the T-slot. The key accurately positions the cube relative to the slot on the assembly machine module and the threaded fastener secures the cube thereto. The parallelism and perpendicularity of the various faces of the cube are highly accurate. Various assembly and testing components of the assembly machine are attached to the various remaining perpendicular and parallel (vertical and horizontal) faces or surfaces of the cube.

It is therefore an object of the present invention to provide a mounting fixture in the shape of a cube for a reconfigurable assembly machine.

It is a further object of the present invention to provide a mounting fixture for an assembly machine module defining perpendicular and parallel surfaces which accurately orthogonally and securely support diverse assembly and testing devices on an assembly machine module.

It is a still further object of the present invention to provide a mounting fixture in the shape of a cube for a reconfigurable assembly machine having a plurality of keyways which receive complementarily configured locating keys.

It is a still further object of the present invention to provide a mounting fixture in the shape of a cube having an integrally formed key projecting therefrom.

It is a still further object of the present invention to provide a mounting fixture in the shape of a cube for a reconfigurable assembly machine having a locating key which is received within complementarily configured channels in the fixture and the module.

It is a still further object of the present invention to provide a mounting fixture in the shape of a cube for a reconfigurable assembly machine having a threaded fastener extending through a locating key.

Further objects and advantages of the present invention will become apparent by reference to the following description of the preferred embodiment and appended drawings wherein like reference numbers refer to the same element, component or feature.

BRIEF DESCRIPTION OF THE DRAWINGS

FIG. 1 is a perspective view of a reconfigurable assembly machine incorporating the present invention;

FIG. 2 is a fragmentary perspective view of a chain track assembly for a reconfigurable assembly machine incorporating the present invention;

DESCRIPTION OF THE PREFERRED EMBODIMENT

Figure 3:
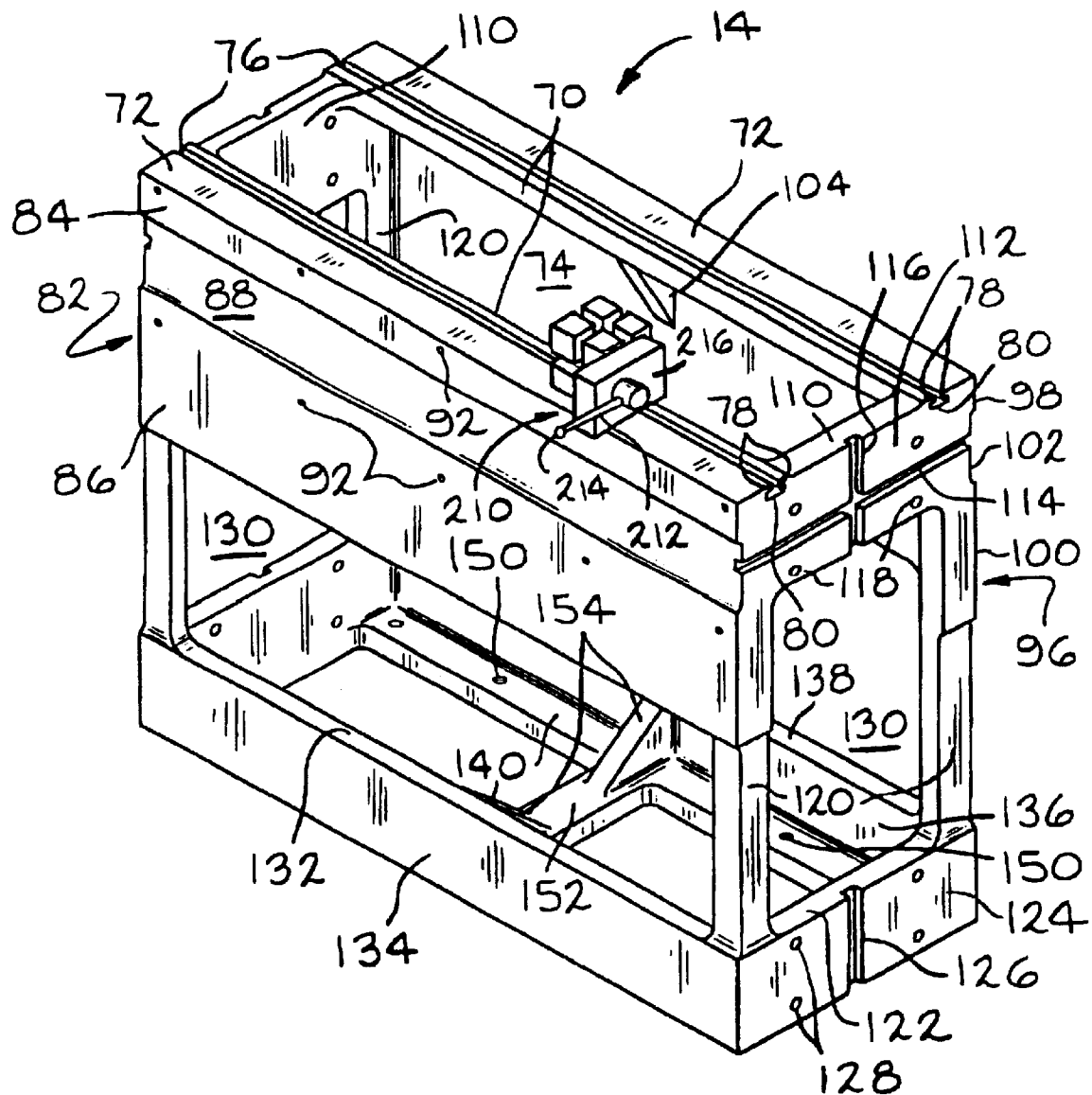
FIG. 3 is a perspective view of a modular support for a reconfigurable assembly machine having a mounting fixture according to the present invention and a test probe assembly secured thereto.

Referring now to FIG. 1, a reconfigurable assembly machine incorporating the present invention is illustrated and generally designated by the reference number 10. If desired, the reconfigurable assembly machine 10 may be disposed upon a rectangular, planar, elongate foundation or mounting plate 12. The optional mounting plate 12 functions as a rigid and dimensionally stable foundation for the assembly machine 10 and may be a suitable material such as hot rolled steel having a width and length at least equal to the corresponding dimensions of the equipment to be placed thereon and preferably somewhat longer and significantly wider.

Juxtaposed along the length of the mounting plate 12 are a plurality of support modules 14. The support modules 14 may be arranged in either a single file configuration or paired in an adjacent, back-to-back configuration as illustrated in FIG. 1. At one end of the plurality of support modules 14 is a drive module 16 which preferably includes an electric motor 18 and an indexing or incrementing gear drive assembly 20. The incrementing gear drive assembly 20 converts the continuous, relatively high speed input from the electric motor 18 to an intermittent, incremental low speed output which drives a chain assembly 22. The chain assembly 22 comprises a plurality of interconnected flat plates or links 24 which circulate in an oval path along the upper portions of the support modules 14. The links 24 are pivotally or hingedly interconnected through the agency of interengaging or interleaved ears 26 and a pivot pin 28 in a structure which generally resembles a hinge. The links 24 preferably include a plurality of threaded apertures 30 arranged in an array which are suitable for the securement of various component and assembly fixtures and the like.

The drive module 16 also drives a shaft 32 which, through a right hand drive assembly 34 and an interconnected output shaft 36 provides rotary drive energy to assemblies disposed on various support modules 14 as will be more fully explained below.

As illustrated in FIG. 2, the links 24 of the chain assembly 22 traverse the side of the support modules 14 in a track assembly 40. The track assembly 40 includes a support plate 42, a lower rail assembly 44 and an inverted, upper rail assembly 46. Both the lower rail assembly 44 and the upper rail assembly 46 are identical but for the fact that one is arranged in an inverted fashion relative to the other. Accordingly, it will be appreciated that both the lower rail assembly 44 and the upper rail assembly 46 include a pair of wider, exterior plates or bars 48 and a narrower, interior bar 50. The interior bars 50 of the lower rail assembly 44 and the upper rail assembly 46 conjunction with each pair of exterior bars 48 define grooves 52 which slidably receive the links 24 of the chain assembly 22. A plurality of threaded fasteners 54 secure the upper and lower rail assemblies 44 and 46 as well as the support plate 42 to the individual support modules 14.

As illustrated in FIG. 1, the drive module 16 also includes a semi-circular curved track portion 56 which facilitates circulation of the chain assembly 22 from one side of the assembled support modules 14 to the other. Disposed at the opposite end of the assembly machine 10 from the drive module 16 is an idle module 60 which redirects circulation of the chain assembly 22 from one side or face of the assembled support modules 14 to the other. Accordingly, it also includes a semi-circular curved track portion 62 which is in all respects like the curved track portion 56 of the drive module 16.

Turning now FIG. 3, an individual support module 14 is illustrated. The support module 14 is a generally rectangular frame which is preferably first cast and then machined. It should be appreciated at the outset that one of the significant features of the support module 14 is its highly accurate size, i.e., its squareness and surface-to-surface dimensions; and thus its interchangeability or exchangeability with other support modules 14. Hence, both the casting and the finishing undertaken upon the casting which will become the support module 14 must be of the highest dimensional accuracy. The support module 14 is preferably steel but may also be aluminum or other suitable rigid and stable material. As utilized herein, the terms "machined" and "finished" refer generally to any highly accurate process such as milling, grinding or the like which is typically used to achieve a surface with excellent planarity, dimensional accuracy and smoothness. The terms "machined" and "finished" should not, however, be construed to exclude either other currently available manufacturing processes capable of producing surfaces with such characteristics or subsequently developed or perfected manufacturing processes such as powdered metal casting capable of producing a substantially or completely finished and ready to use support module 14 having such characteristics.

As noted, the support module 14 is a rectangular frame or shell having a pair of spaced-apart top sections or panels 70 which are disposed adjacent the front and rear faces of the support module 14. The top sections or panels 70 define a respective pair of co-planar, parallel, spaced-apart machined or finished top surfaces 72 and a generally rectangular open area 74. Disposed adjacent the open area 74 and extending along the full length of the top panels 70 are pair of channels or grooves 76 each defined by a pair of opposed, overhanging flanges or lips 78 which also partially define a wider, undercut region 80. The opposed lips 78 and the undercut region 80 thus define an inverted "T" shape. The undercut region 80 receives fasteners having complementarily sized heads as will be more fully described below.

The upper front portion of the module 14 includes an upper, longitudinal, front section or panel 82 having an upper, front, planar machined or finished surface 84 and an intermediate, front, planar machined or finished surface 86 which are disposed on opposite sides of a recessed surface 88. The front machined surfaces 84 and 86 are co-planar and preferably extend the full length of the support module 14. The upper front panel 82 includes a plurality of threaded apertures 92 which receive the threaded fasteners 54 which secure the rail assemblies 44 and 46 to the support module 14.

The back face of the support module 14 is identically configured and includes an upper, longitudinal, rear section or panel 96 having an upper, rear, planar machined or finished surface 98 and an intermediate, rear, planar machined or finished surface 100 disposed on opposite sides of a recessed surface 102. The rear machined surfaces 98 and 100 are co-planar and preferably extend the full length of the support module 14. The upper rear panel also preferably includes a plurality of threaded apertures 92. The upper front panel 82 and the upper rear panel 96 are strengthened and stabilized by a pair of triangular webs or gussets 104 which extend between each of the top panels 72 and the adjacent upper front panel 82 and the upper rear panel 96. Only the gusset 104 associated with the upper rear panel 96 is illustrated in FIG. 3.

The ends of the support module 14 are also identically configured and thus only the forward end visible in FIG. 3 will be described, it being understood that the rear (hidden) end is configured identically. Each of the upper ends of the support module 14 include an upper, transverse section or panel 110 having an upper, transverse, planar machined or finished surface 112. Formed in the upper transverse panel 110 by any suitable manufacturing or machining process such as cutting, milling or grinding is a first horizontal transverse slot or channel 114 and a vertical, intersecting slot or channel 116 which is preferably disposed precisely in the middle of the transverse panel 110. Also formed in the upper transverse panel 110 are a plurality of through apertures 118.

The vertically medial portion of the support module 14 is defined by four vertically oriented stanchions or posts 120 disposed generally in the vertical corners of the support module 14 which connect the upper sections 82, 96 and 110 with corresponding lower sections. The lower ends of the support module 14 include lower, transverse sections or panels 122 having lower, transverse, planar, machined or finished surfaces 124 which are co-planar with the upper, transverse machined surfaces 112 of the upper transverse panels 110. Disposed at the transverse mid-point of each of the transverse panels 122 is a vertical slot or channel 126 which is preferably aligned with the vertical channel 116 formed in the upper transverse panels 110. An array or plurality of through apertures 128 are also formed in the lower transverse panels 122. The upper transverse panels 110, the posts 120 and the lower transverse panels 122 define generally rectangular openings 130 in the ends of the support module 14. It should be understood that the upper, transverse machined surfaces 112 and the lower, transverse machined surfaces 124 at each end of the support module 14 are co-planar and that such planes are parallel to one another.

The lower region of the support module 14 also includes a lower, front section or panel 132 having a lower, front, planar machined or finished surface 134 which is co-planar with the upper, front machined surfaces 84 and 86. The lower front panel 132 preferably extends the full length of the support module 14. A complementarily configured lower rear section or panel 136 includes a lower, rear, planar machined or finished surface 138 which is co-planar with the upper rear machined surfaces 98 and 100. The lower rear section or panel 136 likewise preferably extends the full length of the support module 14. It should also be understood that the plane defined by or containing the front, planar machined surfaces 84, 86 and 134 and the plane defined by or containing the rear, planar machined surfaces 98, 100 and 138 are parallel. It should be understood that the front machined surfaces 84, 86 and 134 and the rear machined surfaces are perpendicular to the top machined surfaces 72 and the transverse machined surfaces 112 and 134.

Finally, the support module 14 includes a pair of longitudinally extending bottom sections or panels 140 (one of which is illustrated in FIG. 3) with merge with the adjacent front, lower panel 132 or rear, lower panel 136 and preferably extend longitudinally the full length of the support module 14. The bottom panels 140 are joined in the middle by a transverse beam 142. A pair of triangular webs or gussets 144 extend from the bottom panels 140 and the transverse beam 142 to a respective one of the lower panels 132 and 136. A plurality of threaded fasteners (not illustrated) extend through the bottom panels 140 and are received within complementarily threaded openings in the mounting plate 12 to secure the support modules 14 thereto. Other details of the support module 14 relating to its disposition on the mounting plate 12 may be found in my U.S. Pat. No. 5,904,242, granted May 18, 1999 which is hereby incorporated by reference.

Figure 4:
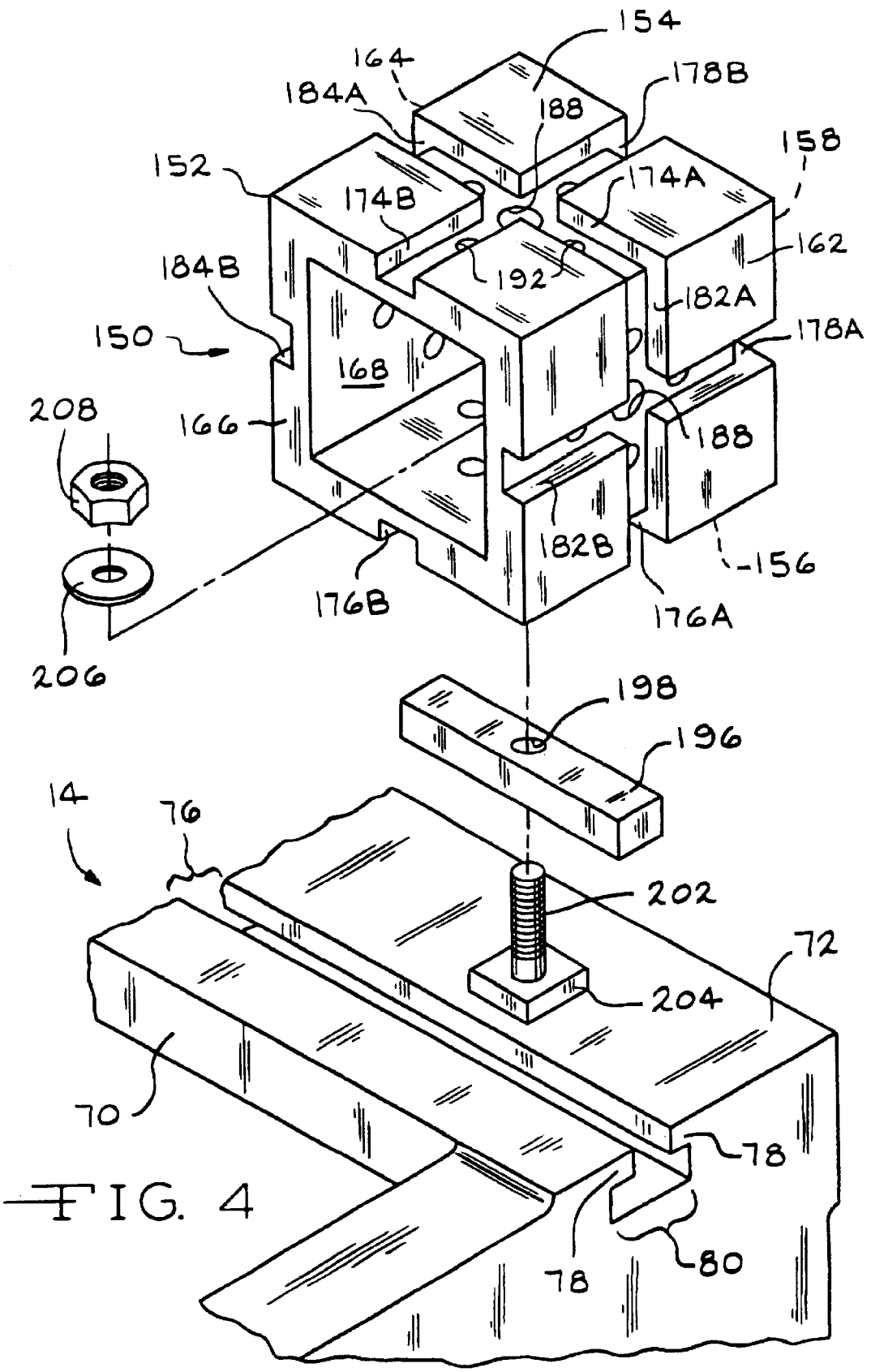
FIG. 4 is a fragmentary, perspective view of a mounting fixture according to the present invention secured to a modular support of a reconfigurable assembly machine.

Turning now to FIGS. 3 and 4, a mounting fixture assembly 150 according to the present invention is illustrated. The mounting fixture assembly 150 includes a hollow brick or cube 152 preferably having equal height, width and depth. A brick or cube 152 which is 5 inches (12.7 cm) per side has been found suitable although larger or small cubes 152 will likely be suitable for certain applications and are within the purview of this invention. The mounting brick or cube 152 is preferably cast of 70 durometer or greater urethane but may also be made from plastics such as ABS, or fiberglass reinforced plastic or metals such as steel or aluminum. The hollow brick or cube 152 defines a top surface 154, a bottom surface 156, a front surface 158 and first and second side surfaces 162 and 164. A back face is defined by an edge 166 and the mounting cube 152 includes an open interior 168. Each of the surfaces or faces 154, 156, 158, 162 and 164 are equal in size and opposed surfaces such as the top surface 154 and the bottom surface 156 and the first and the second side surfaces 162 and 164 are parallel to one another. Furthermore, the side surfaces 162 and 164 are perpendicular to the top and bottom surfaces 154 and 156 and the front surface 158 is perpendicular to both the top and bottom surfaces 154 and 156 and the first and the second side surfaces 162 and 164.

Each of the surfaces 154, 156, 158, 162 and 164 of the mounting brick or cube 152 includes or defines pairs of intersecting keyways. The top surface 154 defines intersecting keyways 174A and 174B, the bottom surface 156 defines intersecting keyways 176A and 176B, the front surface 158 defines intersecting keyways 178A and 178B, the first side surface 162 defines intersecting keyways 182A and 182B and the second side surface 164 defines intersecting keyways 184A and 184B. The pairs of keyways 174A and 174B, 176A and 176B, 178A and 178B, 182A and 182B and 184A and 184B intersect at right angles, i.e., are normal to one another.

At each of the intersections of the keyways 174A and 174B, 176A and 176B, 178A and 178B, 182A and 182B and 184A and 184B is disposed a center, through opening 188. Each of the through openings 188 extends from the surface of the keyways to the open interior 168 of the mounting brick or cube 152. Preferably, the diameter of the through openings 188 is about ⅝ inch (1.59 cm) but may be readily larger or smaller to accommodate a desired purpose or to maintain this approximate relative size with a mounting cube 152 which is larger or smaller than that noted above. Adjacent the through openings 188 and centered in a respective one of the keyways are smaller through openings 192 which again, extend from the surfaces of the keyways 174A and 174B, 176A and 176B, 178A and 178B, 182A and 182B, and 184A and 184B into the hollow interior 168 of the cube 152. Preferably, the diameter of the smaller through openings 192 is about 13/32 inch (1.0 cm) but may be larger or smaller as noted above. The openings 188 and 192 provides suitable attachment locations to and for the mounting cube or brick 152 as will be more fully described subsequently.

Appreciation of the uniform configuration of each of the five surfaces 154, 156, 158, 162 and 164 of the mounting brick or cube 152 will facilitate understanding of the attachment structure as well as the use and applications of the mounting brick or cube 152. As illustrated in FIGS. 3 and 4, mounting or attachment of the mounting brick or cube 152 to a module 14 of an assembly machine 10 utilizes an elongate locating key 196 having a length preferably slightly less than an exterior dimension, e.g., 5 inches, of the mounting cube 152. Preferably, the locating key 196 is made of steel or aluminum. Alternatively, the locating key 196 may be integrally formed with the mounting cube or brick 152 of the same material and project approximately one-half its width from the adjacent surface of the cube or brick 152.

Figure 5:
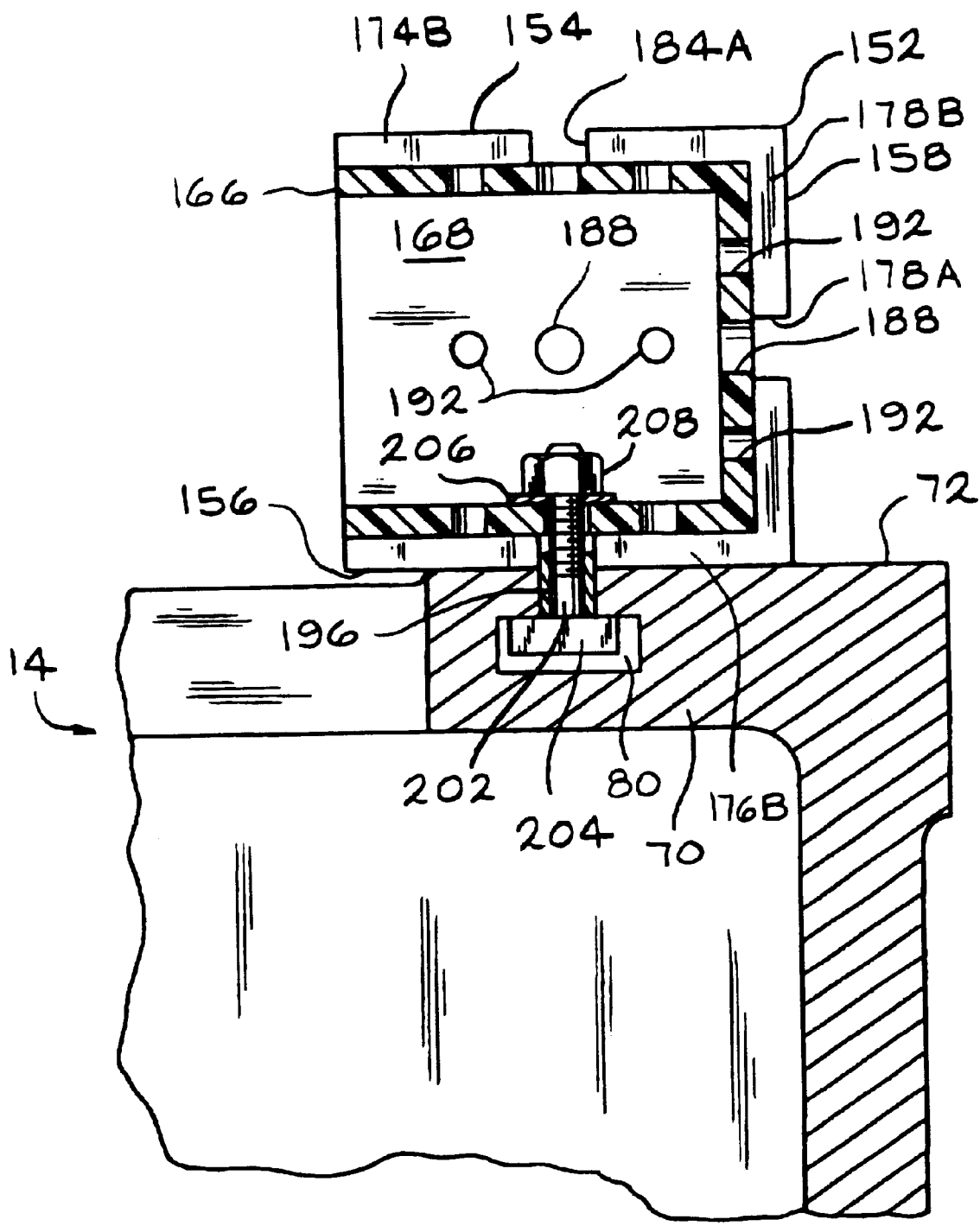
FIG. 5 is a fragmentary, sectional view of a mounting fixture according to the present invention secured to a reconfigurable assembly machine.

The locating key 196 includes a through passageway 198 which receives a threaded fastener such as a bolt 202 having an enlarged, preferably square head 204. The threaded fastener 202 is preferably ⅝–13 but may be larger or smaller and have finer or coarser threads if desired. The threaded fasteners 202 extend through the passageway or aperture 198 in the locating key 196, through the center, through opening 188 in the mounting brick or cube 152 and receive a washer 206 and a nut 208. As illustrated in FIG. 5, the enlarged heads 204 of the threaded fasteners 202 are received within the enlarged region 80 of one of the slots 76 in the module 14 and are slightly smaller in width than the width of the enlarged region 80.

The nuts 208 may be readily tightened and loosened inasmuch as the threaded fasteners 202 are inhibited from rotating because the heads 204 are sufficiently large as to inhibit such rotation but are sufficiently small such that they may slide readily along the slots 76. Thus, if the nuts 208 are loosened, the mounting cube or brick 152 may be readily slid along the slots 76. The locating key 196 very accurately maintains the position of the mounting cube or brick 152 in a direction transverse to the slots 76. The nut 208 may be tightened when the mounting brick or cube 152 is positioned at a desired location along the length of the top panel 72 and the slot 76.

Referring now to FIGS. 3 and 4, a hollow brick or cube 152 according to the present invention is illustrated and disposed on the top surface 72 of a top section or panel 70 of the support module 14, adjacent its front section or panel 82. By way of example and illustration and not by way of limitation, a dimension checking probe assembly 210 is secured to a vertical, i.e., second side, surface 164 of the brick or cube 152. The dimension checking probe assembly 210 includes a moveable arm 212 and sensing tip 214 as well as an associated sensing mechanism (not illustrated) contained within a housing 216. The back surface of the housing 216 preferably includes a keyway having a width equal to the width of the keyway 184B or, in the alternative, an integrally formed key which projects from the housing 216 and likewise has a width equal to the width of the keyway 184B. One or a pair of threaded fasteners (not illustrated) which extend through the openings 188 or 192 secure the housing 216 to the mounting brick or cube 152 in conventional fashion.

Thus, it will be appreciated that a mounting brick or cube 152 according to the present invention provides accurate, orthogonal, perpendicular and parallel (vertical and horizontal) surfaces to which various assembly and testing components may be securely attached to an assembly machine module 14. Furthermore, the mounting scheme utilizing the channels or slots 76, the locating key 196, one of the keyways 174A, 174B, 176A, 176B, 178A, 178B, 182A, 182B, 184A or 184B, the bolt 202, the washer 206 and the nut 208 readily facilitate assembly, adjustment and removal of the mounting block or cube 152 from the assembly machine module 14.

It should also be appreciated that subsequent to such positioning and securement of the mounting brick or cube 152 to the module 14 of an assembly machine 10, additional ones of the keyways 174A, 174B, 176A, 176B, 178A, 178B, 182A, 182B, 184A or 184B may be utilized with locating keys 176, the bolts 202, the washers 206 and the nuts 108 or other fasteners securable through the smaller openings 192, with or without the locating keys 196, to accurately and securely attach various assembly and testing devices, such as the aforementioned dimension checking probe assembly 210, to as many of the five surfaces 154, 156, 158, 162 and 164 as is necessary.

The foregoing disclosure is the best mode devised by the inventor for practicing this invention. It is apparent, however, that apparatus incorporating modifications and variations will be obvious to one skilled in the art of accessories and components for assembly machines. Inasmuch as the foregoing disclosure presents the best mode contemplated by the inventor for carrying out the invention and is intended to enable any person skilled in the pertinent art to practice this invention, it should not be construed to be limited thereby but should be construed to include such aforementioned obvious variations and be limited only by the spirit and scope of the following claims.

I claim:

1. A mounting fixture for an assembly machine module comprising, in combination,
    a cube having five surfaces and a hollow interior, at least one of said surfaces defining a keyway and an opening aligned with said keyway,
    a key having a through opening, and
    a fastener extending through said one opening in said key and said opening in said cube and having a head capable of inhibiting rotation of said fastener.

2. The mounting fixture of claim 1 wherein said fastener is threaded and includes a square head.

3. The mounting fixture of claim 1 further including an assembly machine module having a slot defined by opposed, overhanging flanges.

4. The mounting fixture of claim 3 wherein said fastener includes a head configured to slide but not rotate in said slot.

5. The mounting fixture of claim 1 wherein said cube includes parallel top and bottom surfaces and parallel side surfaces normal to said top and bottom surfaces.

6. The mounting fixture of claim 1 wherein each of said five surfaces includes a pair of intersecting keyways.

7. A mounting fixture for an assembly machine module or the like comprising, in combination,
    a mounting block having five surfaces and a substantially open face communicating with a hollow interior, at least one of said five surfaces including a keyway, and at least one opening extending from said keyway to said hollow interior,
    an elongate key partially transversely received in said keyway, projecting from said mounting block and including a through passageway aligned with said at least one opening, and
    a fastener extending through said at least one opening and said through passageway and including a head portion engageable by a machine element,
    whereby said elongate key and said at least one of said surfaces locates said mounting block on the assembly machine module.

8. The mounting fixture of claim 7 further including a second keyway in said at least one of said surfaces oriented perpendicularly to said keyway and wherein said keyway and said second keyway define a keyway intersection and said at least one opening is located at said keyway intersection.

9. The mounting fixture of claim 7 wherein said fastener is threaded and includes a square head.

10. The mounting fixture of claim 7 wherein said mounting block includes parallel upper and lower surfaces.

11. The mounting fixture of claim 7 wherein said mounting block includes intersecting keyways on a plurality of said five surfaces.

12. The mounting fixture of claim 7 wherein said mounting block includes parallel top and bottom surfaces and parallel side surfaces normal to said top and bottom surfaces.

13. The mounting fixture of claim 7 wherein said key is integrally formed with said mounting block.

14. The mounting fixture of claim 7 wherein said key and said mounting block are separable components.

15. A mounting fixture for an assembly machine module or the like comprising, in combination,
    a mounting cube having five surfaces and a hollow interior, each of said surfaces defining a pair of intersecting keyways, at least one opening extending from said intersecting keyways to said hollow interior, a plurality of passageways extending from said keyways to said hollow interior, a key disposed in one of said keyways and including a through passageway aligned with said at least one opening, and a fastener extending through said at least one opening and said passageway and including a head portion engageable by a machine element.

16. The mounting fixture of claim 15 further including a frame having a surface, a slot in said surface adapted to receive said key and an enlarged region adjacent said slot adapted to receive said head portion and inhibit rotation thereof.

17. The mounting fixture of claim 15 wherein said head portion is square.

18. The mounting fixture of claim 15 wherein said mounting cube includes parallel upper and lower surfaces and side surfaces normal to said upper and lower surfaces.

19. The mounting fixture of claim 15 wherein said mounting cube includes at least two of said passageways associated with each of said keyways.

20. The mounting fixture of claim 15 wherein said mounting cube is utilized to mount an ancillary device.

* * * * *